Nov. 29, 1960 J. G. RUCKELSHAUS 2,962,393
METHOD OF PREPARING ELECTRICAL RESISTORS
Filed April 21, 1953 2 Sheets-Sheet 1
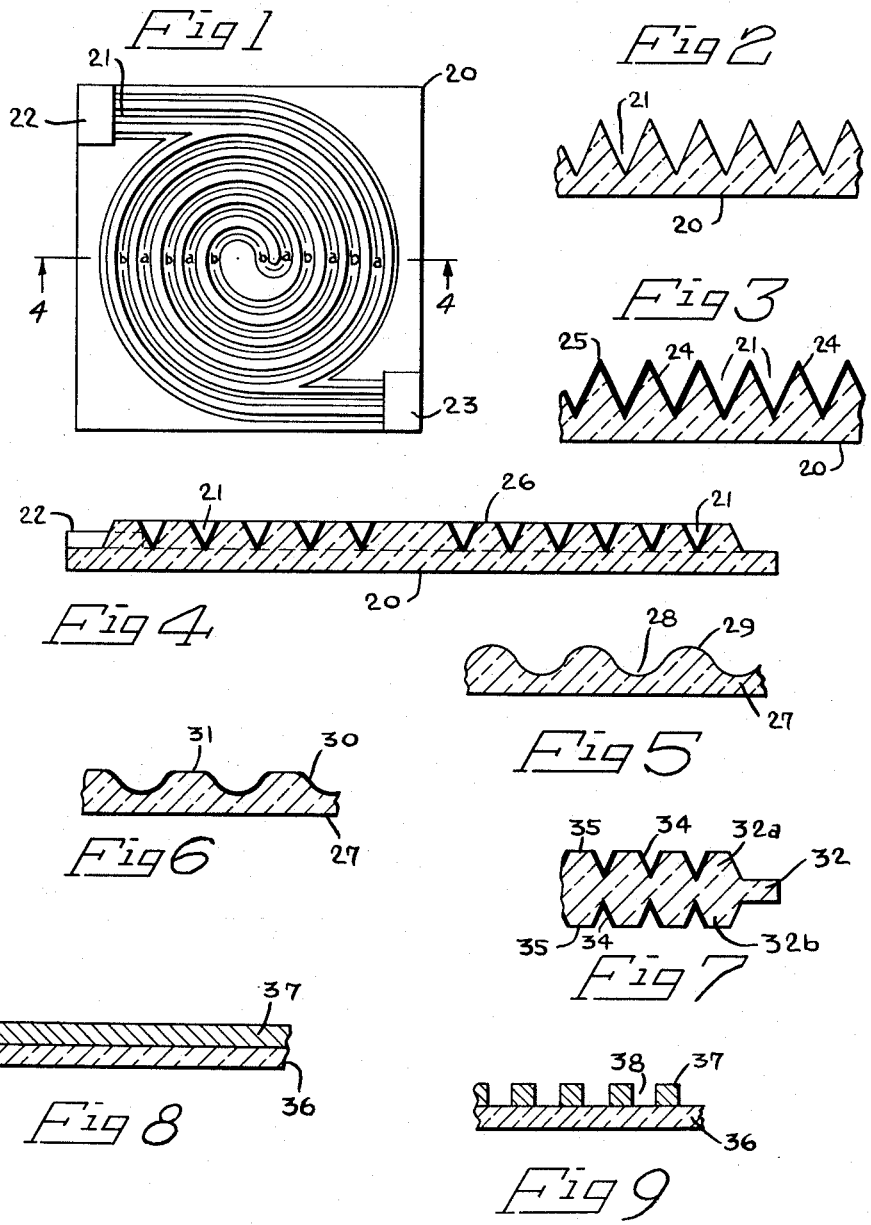
INVENTOR.
JOHN G. RUCKELSHAUS
BY
ATTORNEYS Nov. 29, 1960  J. G. RUCKELSHAUS  2,962,393
METHOD OF PREPARING ELECTRICAL RESISTORS
Filed April 21, 1953  2 Sheets-Sheet 2
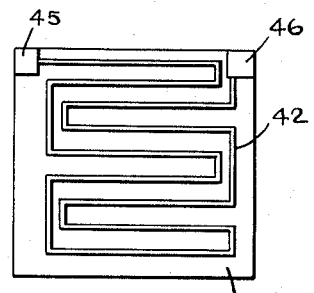
Fig 10
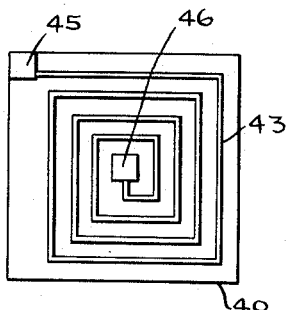
Fig 11
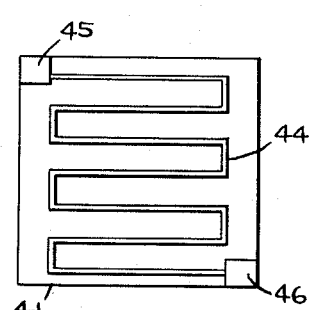
Fig 12
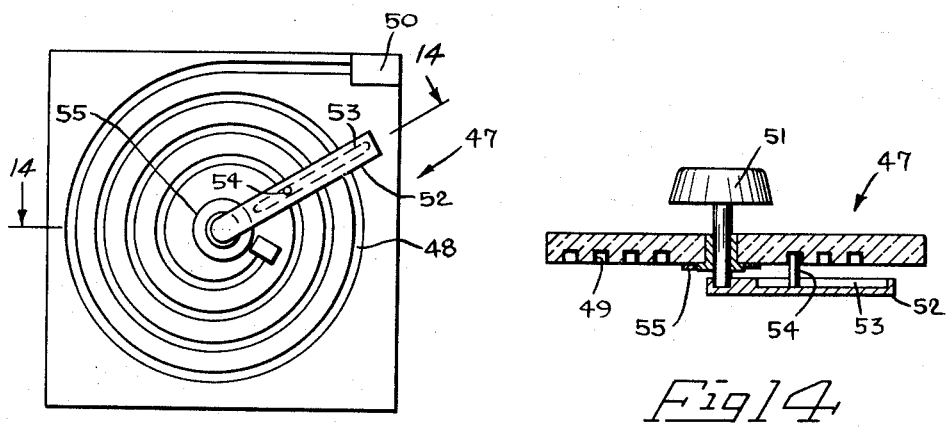
Fig 13
Fig 14
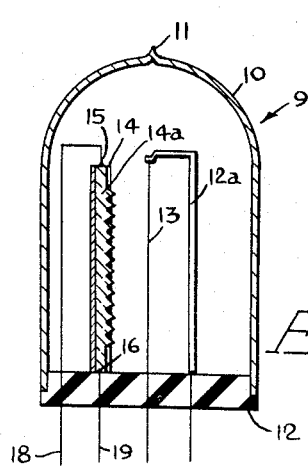
Fig 15
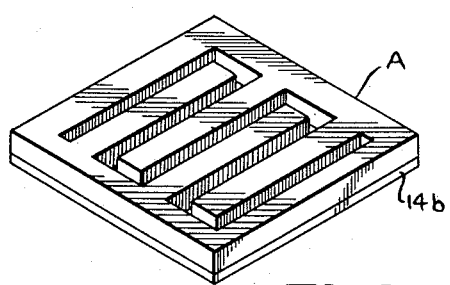
Fig 16
INVENTOR.
JOHN G. RUCKELSHAUS
BY
Dick and Padlen
ATTORNEYS United States Patent Office 2,962,393
Patented Nov. 29, 1960

2,962,393

METHOD OF PREPARING ELECTRICAL RESISTORS

John G. Ruckelshaus, 110 Pomeroy Road, Madison, N.J.

Filed Apr. 21, 1953, Ser. No. 350,154

3 Claims. (Cl. 117—212)

This invention relates to resistors and resistance time measuring devices and to a method of making the same and, more particularly, to a resistance unit in which the value of resistance is changed in direct proportion to the number of hours it is connected to a source of electrical energy, and to a flat plate resistor and the method of making the same.

This invention is a continuation in part of my copending application Serial Number 292,367, fi'ed June 7, 1952, now U.S. Patent No. 2,917,814, issued December 22, 1959.

At present, when it is desired to keep a record of the number of hours an electrical device is operated over a period of time, two methods are most commonly employed. First, a log or record is kept and, each time the equipment is turned on and off, the time is recorded. Second, a timer, consisting of a form of electric clock movement, is connected with the equipment so that, each time it is turned on, the clock movement actuates recording means which registers the total amount of time that the device has been operated. The first method is time consuming on the part of the operator and involves the human element since someone must always enter the time and do it accurately. The second method is comparatively expensive, bulky, and adds considerable weight to the equipment which is objectionable if the device is air-borne equipment.

My invention relates to a method of measuring the time that an electrical or, in fact, any device is operated, which requires neither the keeping of a log nor the use of a clock mechanism.

An object of my invention is to provide a simple, low cost, and accurate device which, when connected to an electrical appliance, or other form of electrical or electronic equipment, will record accurately the number of hours that said appliance or equipment is or has been operating.

Another object of my invention is to provide a flat plate type of resistor unit which may be installed into an electrical device and, after connections have been made to it, said resistance unit can be accurately adjusted to any desired resistance value.

Still another object of my invention is to provide a metal film resistance unit that is stable and has a lower temperature coefficient of resistance than previously used resistors of deposited carbon film.

A further object of my invention is to provide a simple, low cost, accurate, flat plate, precision metal film resistor.

One further object of my invention is to provide a resistor comprising a plate of high dielectric constant material which is glazed with a metalliferous surface of desired pattern or design, symmetrical or asymmetrical, and has terminal conductors at any desired ends thereof.

Another object of my invention is to provide a method of coating a non-conducting outgassed or degassed member, the thickness of the coating depending on the desired electrical resistance, with a film of electric conductive material and forming the ends thereof for connection with conductors.

Still another object of the invention is to provide a method of and means for manufacturing a resistor unit on a mass production basis at relatively low cost.

Still another object of my invention is to provide a flat plate resistor of any desired design which has been initially outgassed to permit formation of a stable film of low temperature coefficient of resistance and to prevent drift of the metal conductor.

One further object of my invention is to provide a non-inductive and/or inductive type of flat plate type of resistor having any suitable desired three dimensional design of conductor film thereon.

Still another object of my invention is to provide a method of coating non-conducting surfaces with any desired design of conductive material to form a non-inductive or an inductive resistor.

One further object of my invention is to provide a method of making flat plate resistors on a unit or batch basis whereby a flat plate member is formed into a desired pattern, degassed and then coated according to the pattern in vacuo and then calibrated to a desired resistance with a low temperature coefficient of resistance.

Other objects and features of my invention will become apparent from the following detailed description, taken in connection with the accompanying drawings, in which:

Fig. 1 is a plan view of a non-inductive resistor made according to and forming part of my invention;

Fig. 2 is a fragmental, partial cross section of insulating material before a film of conductor material is to be applied;

Fig. 3 is the same as Fig. 2 with a film of conductor material already applied;

Fig. 4 is an enlarged cross sectional view taken on line 4—4 of Fig. 1, after the apices or tips of the grooves, as shown in Fig. 2, have been sheared, ground or milled;

Fig. 5 is a modification of Fig. 2;

Fig. 6 is a view of Fig. 5 with a coating of conductor material, after the tops of the grooves have been flattened or ground;

Fig. 7 is a fragmental, sectional view of another modification showing a film of conductor on both surfaces thereof;

Fig. 8 is a fragmental, sectional view of still another modification showing the application of a film of conductor material thereon;

Fig. 9 is a fragmental, sectional view according to Fig. 8 wherein there is shown a pattern of film resulting from milling, grinding or etching;

Fig. 10 is a diagrammatic illustration of a non-inductive resistance of different pattern;

Figs. 11 and 12 are diagrammatic illustrations of inductive type resistors made according to my invention;

Fig. 13 is a bottom plan view of another embodiment of my invention showing an adjustable type plate resistor;

Fig. 14 is a sectional view taken on line 14—14 of Fig. 13;

Fig. 15 is a vertical, sectional view showing apparatus used for coating one or more flat plate resistors in accordance with my invention; and Fig. 16 is a perspective view of means used in one method of forming various embodiments of my invention.

Referring now to the drawings in which similar reference characters denote like parts throughout, I show the following:

In Fig. 15, I show a unit 9 which is provided with a glass envelope 10 with a sealing off tip 11. Said envelope 10 has a base 12 in which is mounted a post 12a having a filament 13 disposed adjacent a jig bracket or fixture 14 holding one or more plates 14a therein. Said fixture 14 is provided with terminal contacts 15 and 16 embedded into it at each end thereof as shown. Furthermore, the bracket is closed on one side so that only one surface of plate 14a may be coated. These contacts 15 and 16 are connected to wires 18 and 19 running through the base 12.

Prior to the coating process of plate 14a, it will be noted that said plate may be ingrained, recessed, corrugated or indented in any suitable manner to form a surface design such as those shown in Figs. 1 to 14, inclusive. Furthermore, such plate may have a flat surface and coated with a mask A of any suitable design, such as that shown covering flat plate 14b in Fig. 16. Also, in accordance with my invention, I may use a flat plate 14b initially in unit 9 and, after coating of the surface, may etch out any desired design, such as shown in the drawings.

Also, in accordance with my invention, before depositing metal on or plating the non-conductor surface in unit 9, it is heated to between 300 to 500° C. for a period ranging up to about 15 hours to drive off gases from all parts within an evacuation chamber. Said unit is connected to the equipment of the type shown in my co-pending application S.N. 292,367 hereinabove indicated.

As indicated in my aforesaid co-pending application, a switch controls the filament of the device as well as the equipment into which it is installed. A milliammeter is connected in circuit with contact terminals of the device and a source of current is also controlled by said switch. When the switch is closed, current flows in the circuit containing the contacts 15 and 16 of plate 14a and the milliammeter. It is a well known physical law that, when a metal filament such as Nichrome or some other alloy, is heated in a container encasing a high vacuum, the metal or alloy will evaporate and deposit either on the inner walls of the container or onto other objects which may be in said vacuum. The amount of metal evaporated is in proportion to the heat of the filament and the length of time that the filament is heated. It can then be seen that, as the metal is evaporated and deposited on the plate 14a, a deposit of the metal will form evenly betwen contacts 15 and 16. These are in circuit with the milliammeter and a source of electrical current will start to pass current as soon as a resistance path is created between lines 15 and 16. The milliammeter dial may be calibrated in hours so that, at first, when a very high resistance path appears between contacts 15 and 16, a low number of hours is recorded. As the filament 13 contaiues to be heated, more and more metal is evaporated onto plate 14a thus creating a lower and lower resistance path between contacts 15 and 16. This coating continues for a predetermined period when the resistance path is such that its low resistance causes a milliammeter connected therewith to read full scale. At this time, either a new resistance element can be installed in the equipment, causing the meter to again start reading at the low end of the scale, i.e., the high resistance of the unit, or a shunt can be switched in to a circuit across the meter and the time recorded on another calibrated scale of the meter.

Should it be desired to record great lengths of time and employ a very sensitive element, a plate of glass or ceramic can be employed. This would allow for a much longer path of resistance between the contacts.

The evaporation of nickel and/or chromium in the filament 13 may be intensified or varied by varying the temperature of the filament to get either element off in the right proportions to produce a harder and more stable film having a low temperature co-efficient of resistance. Furthermore, the plate, when coated, may be subsequently heat treated after evaporation of the metal thereon for a period up to and exceeding 60 hours at 140° C. to relieve the structure strain of the crystal lattices of the two elements and of the alloy deposited on the plate. By doing this, I prevent flaking and relieve the inherent stresses and strains normally present in untreated coatings.

Furthermore, I have found that, before bringing the filament to evaporating temperature, I run the unit at a temperature below its evaporation point to degas or out-gas the alloys and the plate. Furthermore, I have found that I may coat or impregnate the plate and film by evaporating silicon monoxide thereon, thereby bonding glass on the film as a seal.

In the preparation of the plate 14a, according to my invention, several methods are available. One is where the plate per se may be fully coated and then a groove is made in the plate eliminating the metal surface thereat.

Another method is to make a groove of any desired design and symmetry on one or both surfaces of the plate, coat the plate and then cut off the apices of the continuing groove. Examples of these are shown in Figs. 1 to 14.

Still another method is to utilize a mask A of any desired design, such as shown in Fig. 16, as a cover for one or both surfaces of plate 14b, then coat the plate in unit 9 according to the above described method, and then, after the coating operation, remove the mask. Said mask A may be attached to the plate 14b in any suitable manner, such as by small clamps, not shown, or by suitable heat resistant but easily removable adhesive.

In Figs. 1 to 4, inclusive, it will be noted that I provide a plate 20 on which there has been initially grooved, or cut, or moulded, a continuous groove 21 extending from terminal 22 going toward the center of plate 20, then outwardly to terminal 23. The continuity of the grooves 21 toward the center of plate 20 is shown by letter a while the outgoing groove 21 is shown by letter b. In this instance, there is provided a plate with a film 24, a non-inductive resistor wherein the apical shaped grooves 21, as shown in Figs. 2 and 3, are formed. After the coating operation, the apices 25 of the cuts are removed in any suitable manner, such as by grinding or milling, thus leaving a formation such as is shown in Fig. 4 of the drawing. It is to be noted that the reverse of the coating operation may be utilized wherein only the flat tops 26 may be coated thus leaving the grooves clear.

In Figs. 5 and 6 I provide a fragmental view of another type of plate 27 wherein the groove 28 has rounded tops 29. These grooves are coated with a film 30 and the tops 29 are ground or milled forming flat non-coated tops 31.

In Fig. 7 I provide a plate 32 wherein both grooved surfaces 32a and 32b are provided with a coating 34 leaving flat uncoated tops 35 after machining.

In Figs. 8 and 9, I show in exaggerated form a fragmental plate 36 with a coating of conductor film 37 which has been milled to form rectangular grooves 38. In other words, the pattern of the film or coating has been machined to produce rectangular groove formation.

In Figs. 10 to 12, inclusive, I show plates 39, 40 and 41, respectively, with different styles or patterns of conductor coatings 42, 43 and 44, respectively. These types show non-inductive types of resistors. Each plate shows terminals 45 and 46, respectively, wherein one of them is located in a different area on the plate as in Fig. 10.

As hereinabove indicated, any of the methods described above may be used to produce the plates shown.

In Figs. 13 and 14, I show an adjustable type of resistor 47 wherein there is provided on its under surface a spiral groove 48 having a conductor coating 49. Said conductor groove has a marginal terminal 50 and a centrally located insulated knob and handle 51 extending through the center of the resistor 47. Said handle has fixed thereto a radial arm 52 with a radial recess 53 in which is mounted a slidable contact member 54 which may be moved throughout the spiral groove 48 by means of said knob 51 thereby adjusting the resistor 47.

Another terminal 55 is provided toward the center of the resistor to complete the circuit in the resistor.

In manufacturing a device of this type, care must be taken to produce a resistance film that is stable and one that has a low temperature co-efficient of resistance; in fact, one that is far superior to the well known carbon deposited films. It has been found that, by using a nickel-chromium alloy commonly known by the trade name of Nichrome V or Tophet A, such a film can be obtained. The resulting film from such nickel alloy has a much more acceptable temperature coefficient of resistance than the alloy before being evaporated. This because the two metals evaporate in varying amounts proportional to the filament temperature, resulting in a slightly different alloy from the original. It has been found also that, in order to make a stable resistor by this method, highly glazed ceramic or glass must be used. In the case of making carbon deposited film resistors, just the opposite is the case.

In addition to the above alloys or metals, I may employ pure metals or alloys thereof for coating the plates above indicated. It has been found that a pure nickel chromium alloy, free of impurities such as iron and/or aluminum, has produced a more stable unit or resistance and the control of temperature coefficient of resistor is much more accurate.

Furthermore, it will be noted that the terminals are preferably applied initially before evaporating the metal or alloy thereon.

The above mentioned unit has many other applications besides the one referred to. For example, it can be installed in electrical equipment without the milliammeter and supplied with a calibration chart showing what the resistor will read after a certain number of operational hours. An ohm meter or resistance bridge can be placed across the terminals 15 and 16. Resistance readings can then be checked against the chart in order to determine the number of hours the unit has been in operation.

Another unique application is that it can be used as an accurate fixed resistor installing it into a circuit, then, after it is installed, heat the filament until the exact resistance is obtained. The filament heating can then be disconnected and an hermetically sealed precision resistor remains.

It can readily be seen that many resistors can be strung onto one fixture, and said filament 13 heated so as to produce several resistors at a time. These can be removed from the envelope 10 and terminals 18 and 19 attached, thus economically forming a stable metal film resistor of extremely low temperature coefficient of resistance. In this case, the ends of the plate can be filled with a casting material.

It is to be noted that one of the major advantages of producing relatively pure nickel-chrome alloy resistors, according to the invention above described, is that great amounts of these materials will be saved. For example, when one megohm wire wound resistors are manufactured under the armed services JAN 93 specification, only 40 units per pound are obtained. Approximately 10% of the wire used is scrapped in the calibration process. Fine enamelled wire, such as .0015″, used in these resistors, is very difficult to manufacture and very expensive. Resistors made according to my invention have bare surface of approximately .010″ diameter or less which is easy to manufacture and costs approximately 10% of that used on wire wound resistors. Also, a better resistor results.

A comparison of the temperature coefficient of resistance of the three types most widely used in producing precision resistors, namely, wire wound, deposited carbon film, boron carbon, and my new type is made herein. The comparisons are tabulated in order to show the advantage of employing my method of evaporation in the production of resistance units. It should be noted that, although Nichrome V is used as the filament in our process, the deposited metal film is far better in being of lower temperature coefficient of resistance than the original nickel chromium alloy.

*Parts per million change in resistance per degree C. temperature*

| Resistance Value | Boron Carbon Resistor | Deposited Carbon Resistor | Nichrome Wire Resistor | Nichrome V Wire Resistor | Evaporated Nickel Chrome Alloy, Pure |
|---|---|---|---|---|---|
| 10 ohms | 50 | | 170 | 130 | 30 |
| 100 ohms | 80 | 280 | 170 | 130 | 30 |
| 1,000 ohms | 100 | 310 | 170 | 130 | 30 |
| 30,000 ohms | 100 | 330 | 170 | 130 | 50 |
| .1 megohm | 150 | 350 | 170 | 130 | 60 |
| 0.5 megohm | 175 | 375 | 170 | 130 | 80 |
| 1.0 megohm | 200 | 400 | 170 | 130 | 100 |

In addition to the above mentioned features that tend to create a very high grade stable resistance unit, my resistor is on a flat plate of either glazed ceramic or glass or other suitable material whereas the other types above referred to are normally deposited or wound on the outside of tubes or rods and the resistance elements covered with varnishes and the like, which varnishes do not protect the element or hermetically seal it as does the method by which my units are made. A glazed and sealed surface for evaporating according to my invention is necessary in order to obtain a stable resistance element.

From the foregoing description, taken in connection with the accompanying drawings, it will be noted that, by my invention, I provide a resistor having a film of nickel-chrome alloy deposited on the surface of a glazed or unglazed ceramic, glass or similar material on which a metal terminal material has been baked or otherwise deposited at each end. Furthermore, there is provided a surface in which grooves have been cut either in the form of a helix, curves or parallel lines having metal terminals deposited at each end of the plate, and a metallic film is deposited on the plate to form a resistance path between the metal terminals. The metal film may be removed from the surface so as to form threads of resistance material in one case and parallel resistance paths between the metal terminals in the second, said removal being dependent upon the amount of resistance desired or needed, but approximately the same amount of material will always be removed from all parts. This differs from other procedures where a carbon mass is deposited on a tube and a cutter cuts a helix of resistance material out of the solid mass up to a point where the desired resistance value is obtained. This may be half or a quarter of the way across the length of the tube, putting all the strain on that part which is cut. In my invention, the entire length may be adjusted evenly.

Also, a resistor is provided having a metal terminals on the ends of the plates and electrically connected to the terminal bands so as to form an effective, permanently coated resistor unit.

By my invention, very low resistance values are obtained by using designs on the surface plate from end to end and, for higher values, finer grooves. A coarse thread running from end to end on the plate will produce a higher value, a finer thread a still higher value, and a very fine thread, a still higher resistance value. By using the different depth threads and grooves, it is not necessary to cut the ceramic away. Enough alloy is removed to produce the desired resistance value. Thus, I cut no more from a very fine thread groove to produce a very high value than I do from a coarse one to produce a low value.

As to stability in resistors, I have found that, by using nickel-chromium alloy substantially free of any impurities, there is practically no voltage coefficient of resistance whereas, in other types of filaments, this is a factor. Also, over five temperature cycles of −60° C. to 150° C., the drift of my resistor is generally under about 0.2%. In carbon film resistors, it is often 1% or more.

As to the deposited film formed on the plates, the thickness may vary depending on the need and use and may be anywhere from one micron to forty microns and, in some cases, greater.

While preferred embodiments of my invention have been illustrated and described, it is to be understood that modifications as to form, arrangement of parts and use of materials may be made without departing from the spirit and scope of the invention as claimed herein.

I claim:

1. The method of making an electrical resistance element on a non-conducting base on which are formed electrical terminals comprising placing the base in a vacuum chamber, said base having said surface proximate to an alloy filament also in said chamber, evacuating the chamber and heating the filament and base in said chamber to a temperature below the sublimation temperature of the alloy filament to degasify the base and the filament, then passing a current through the filament, the magnitude of the current being sufficient to heat the filament to a point where the constituent elements of the filament are transferred onto said proximate surface of the base and over at least a portion of each of said terminals.

2. The method according to claim 1, and removing the base from the chamber and heating the same to stabilize the resistance of the resultant film formed on said base.

3. The method according to claim 1 wherein the magnitude of the current is adjusted to heat said filament to a critical temperature at which the constituent metals of the alloy are transferred to the base at a predetermined ratio resulting in the film transferred to the base having a temperature coefficient falling within a desired range.

References Cited in the file of this patent

UNITED STATES PATENTS

| | | |
|---|---|---|
| 1,606,153 | Douglas | Nov. 9, 1926 |
| 1,717,712 | Loewe | June 18, 1929 |
| 1,832,466 | Means | Nov. 17, 1931 |
| 2,047,351 | Alexander | July 14, 1936 |
| 2,100,045 | Alexander | Nov. 23, 1937 |
| 2,139,640 | Mall et al. | Dec. 6, 1938 |
| 2,297,488 | Luderitz | Sept. 29, 1942 |
| 2,330,782 | Morelock | Sept. 28, 1943 |
| 2,357,473 | Jira | Sept. 5, 1944 |
| 2,400,404 | Fruth | May 14, 1946 |
| 2,456,899 | Strong | Dec. 21, 1948 |
| 2,569,773 | Orr | Oct. 2, 1951 |
| 2,575,392 | Peters et al. | Nov. 20, 1951 |
| 2,586,752 | Weber et al. | Feb. 19, 1952 |
| 2,621,276 | Howland | Dec. 9, 1952 |
| 2,622,178 | Glynn | Dec. 16, 1952 |
| 2,628,927 | Colbert | Feb. 17, 1953 |
| 2,727,118 | Longini et al. | Dec. 13, 1955 |
| 2,745,767 | Auwarter | May 15, 1956 |
| 2,748,031 | Kafig | May 29, 1956 |

FOREIGN PATENTS

| | | |
|---|---|---|
| 517,586 | France | Dec. 20, 1920 |
| 342,300 | Great Britain | Jan. 28, 1931 |
| 461,275 | Great Britain | Feb. 15, 1937 |
| 841,327 | France | Feb. 1, 1939 |
| 606,894 | Great Britain | Aug. 23, 1948 |

OTHER REFERENCES

Morison: "Mirror Surface on Blown-Out Bulbs," Scientific American, August 3, 1918, page 89.

Heritage: "Metal Film Resistors," Electronic Engineering, July 1952, pages 324–327 inclusive.